Aug. 24, 1926.　　　　　　　　　　　　　　　　　　1,597,634
L. M. STEPHENS
AUTOMOBILE TRAILER CONSTRUCTION
Filed Oct. 2, 1925　　　　4 Sheets-Sheet 1

Lynn M. Stephens
INVENTOR

BY Victor J. Evans
ATTORNEY

WITNESS: J. T. L. Wright

Aug. 24, 1926.
L. M. STEPHENS
1,597,634
AUTOMOBILE TRAILER CONSTRUCTION
Filed Oct. 2, 1925    4 Sheets-Sheet 2
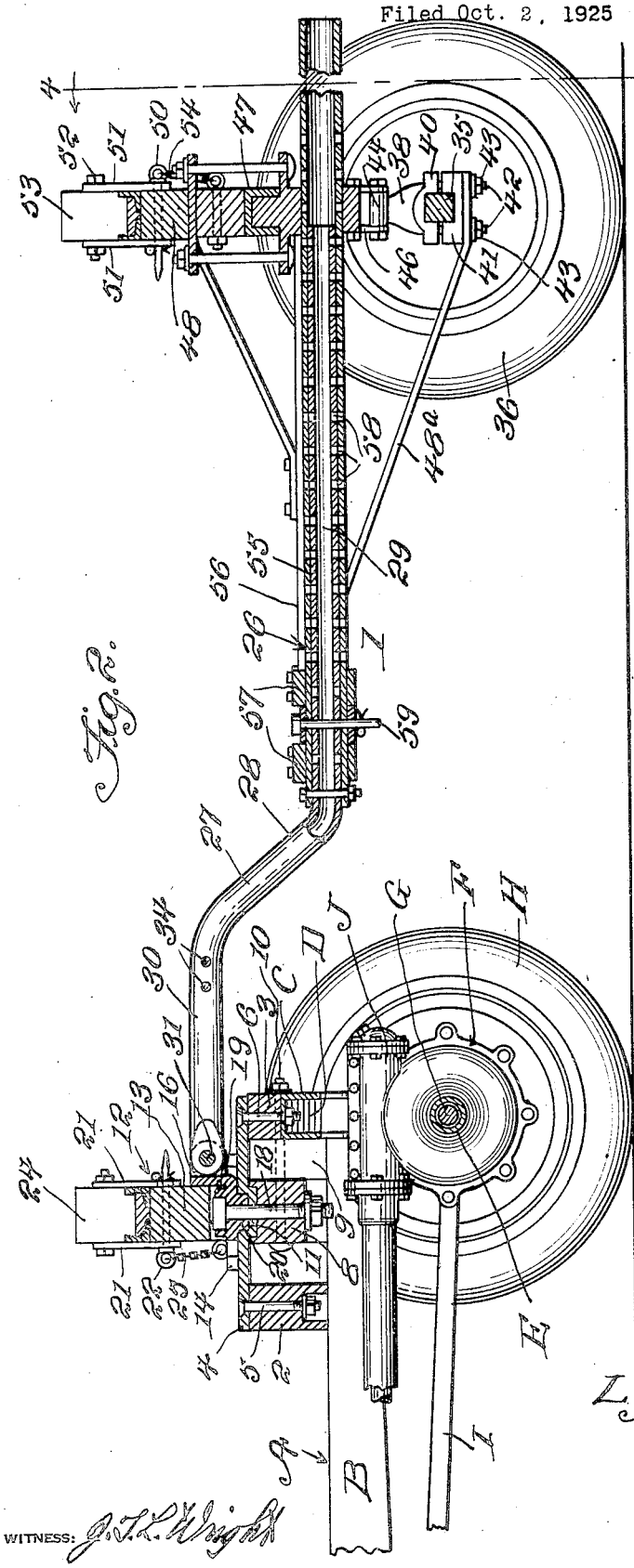
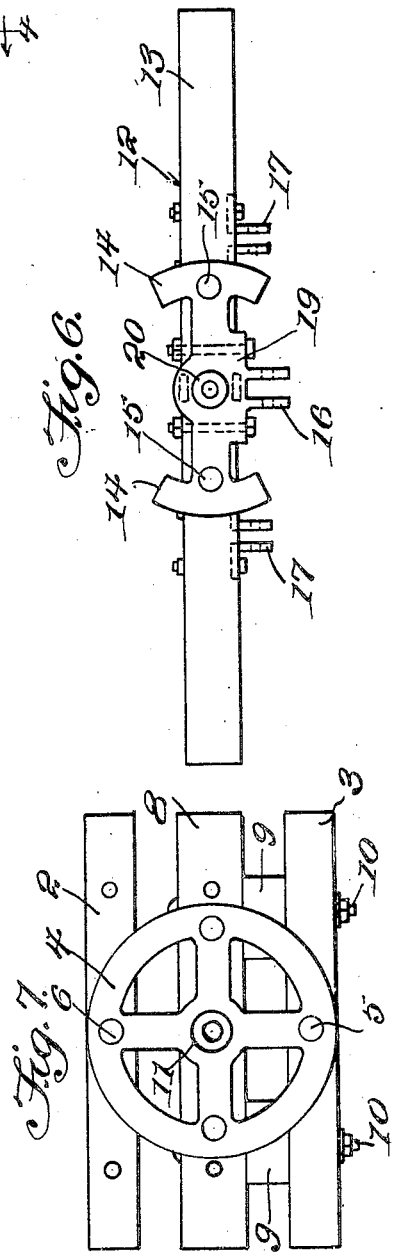
Lynn M. Stephens
INVENTOR
BY Victor J. Evans
ATTORNEY
WITNESS:

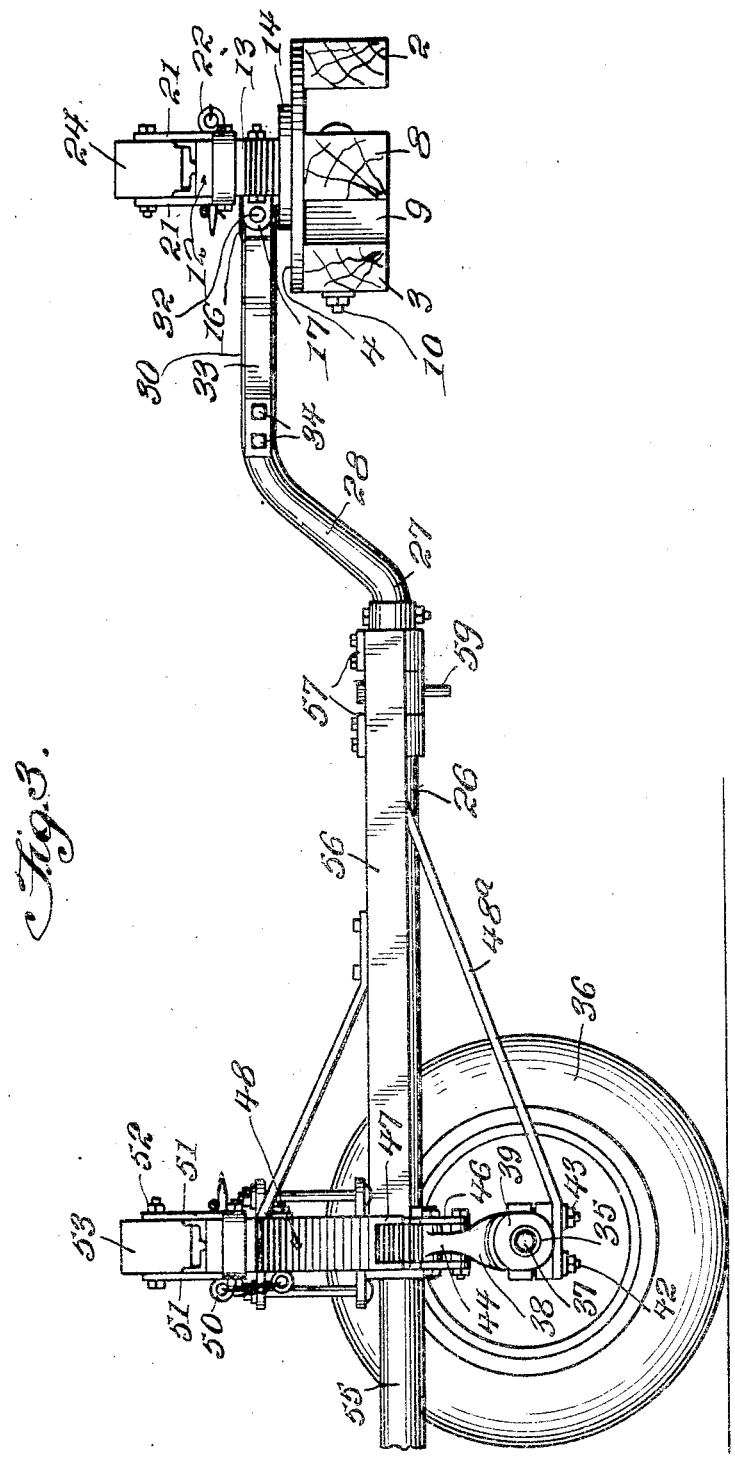

Aug. 24, 1926.
L. M. STEPHENS
1,597,634
AUTOMOBILE TRAILER CONSTRUCTION
Filed Oct. 2, 1925    4 Sheets-Sheet 4
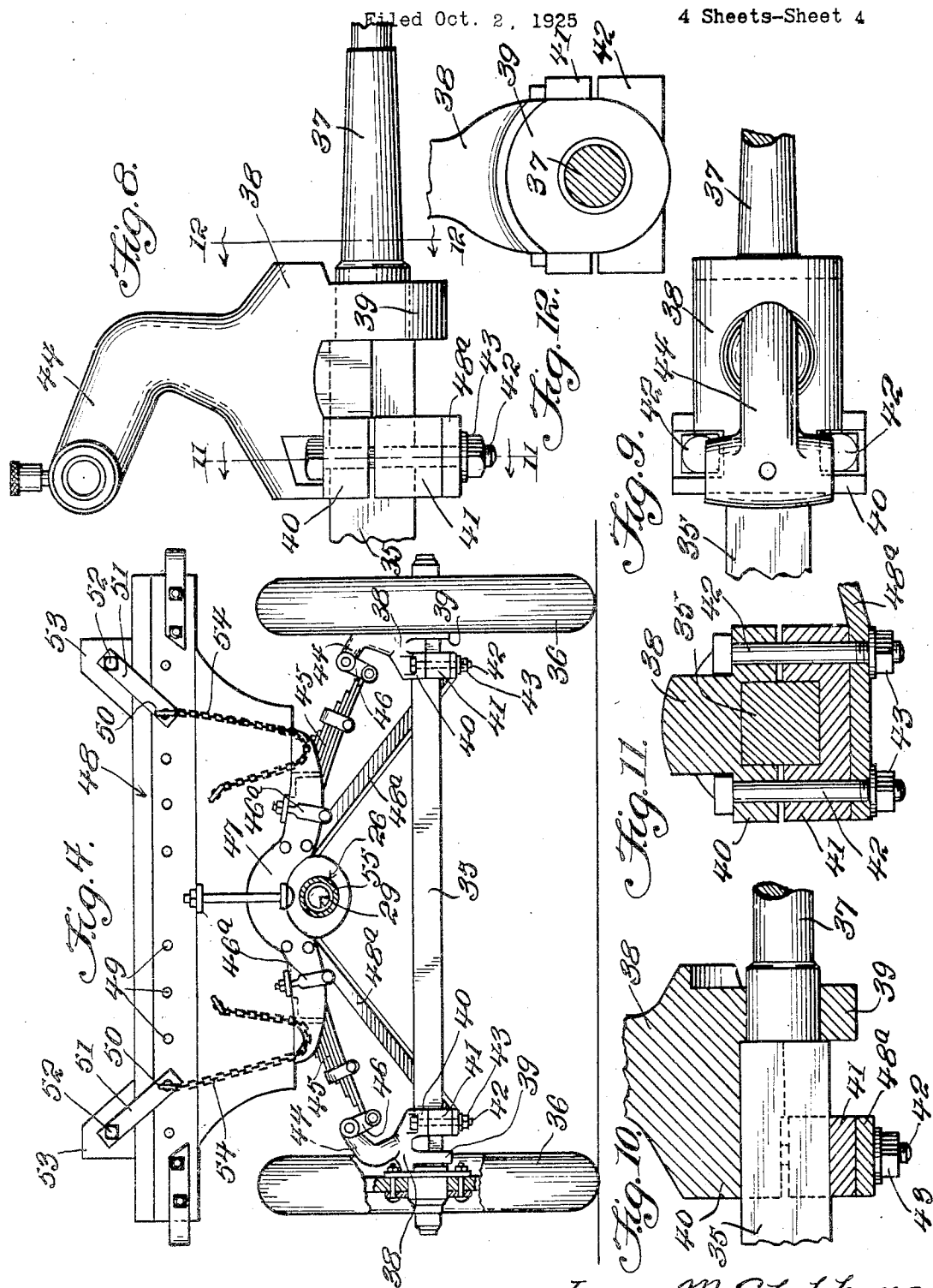
Lynn M. Stephens
INVENTOR
BY Victor J. Evans
ATTORNEY
WITNESS:

Patented Aug. 24, 1926.

1,597,634

UNITED STATES PATENT OFFICE.

LYNN MILTON STEPHENS, OF ZWOLLE, LOUISIANA.

AUTOMOBILE TRAILER CONSTRUCTION.

Application filed October 2, 1925. Serial No. 60,067.

This invention relates to motor vehicles, particularly to attachment therefor in the nature of trailers, and has for its object the provision of a novel trailer structure and means for connecting the same with and mounting it upon an ordinary chassis of the worm gear driven or other type whereby to provide a strong and durable structure capable of withstanding heavy loads and prolonged service.

An important object is the provision of a trailer construction and mounting or connecting means therefor wherein the trailer itself will be flexibly supported with respect to the rear end of the ordinary chassis to which it is attached, the flexibility including capability of lateral movement and also up and down movement in order that the device will be capable of travelling over uneven surfaces as is bound to occur in road travel.

Still another object is to provide a trailer structure including a longitudinally movable or adjustable reach rod whereby the position of the axle of the trailer with respect to the rear axle of the motor vehicle chassis to which it is attached may be adjusted to meet different requirements as circumstances may dictate.

A still further object is to provide a device of this character embodying a fifth wheel construction mounted above the rear axle of the chassis to which the device is attached, this fifth wheel supporting a rotatably mounted element at the forward end of the trailer attachment so as to permit the trailer to move laterally in following the main vehicle itself.

An important object of the invention is to provide a peculiar perch construction whereby to mount a spring suspension or supporting means for a bolster constituting the rear support of the trailer.

Yet another object is the provision of a trailer embodying a bolster pivotally mounted with respect to the rear end of the frame of the vehicle chassis to which the device is attached and another bolster carried by the above mentioned perch construction, both bolsters carrying laterally adjustably mounted supports or stops, the position of which may be varied in accordance with the nature of the load carried or whatever body may be mounted upon the trailer itself.

An additional object of the invention is the provision of a structure of this character which will be comparatively simple and inexpensive in manufacture, easy to assemble and install, positive in action, efficient and durable in service, and a general improvement in the art.

With the above and other objects and advantages in view, the invention consists in the details of construction, and the arrangement and combination of parts to be hereinafter more fully described and claimed, and illustrated in the accompanying drawings, in which:—

Figure 2 is a central longitudinal section therethrough taken on the line 2—2 of Figure 1.

Figure 3 is a side elevation of the attachment alone.

Figure 4 is a rear elevation.

Figure 5 is a detail view showing an elevation of the bolster mounted above the fifth wheel structure.

Figure 6 is a detail plan view of the bearing structure cooperating with the fifth wheel.

Figure 7 is a plan view of the fifth wheel structure alone.

Figure 8 is an enlarged side elevation of one of the perches.

Figure 9 is a top plan view thereof.

Figure 10 is a detail longitudinal section therethrough.

Figure 11 is a detail in cross section taken on the line 11—11 of Figure 8.

Figure 12 is a cross section taken on the line 12—12 of Figure 8.

Figure 1:
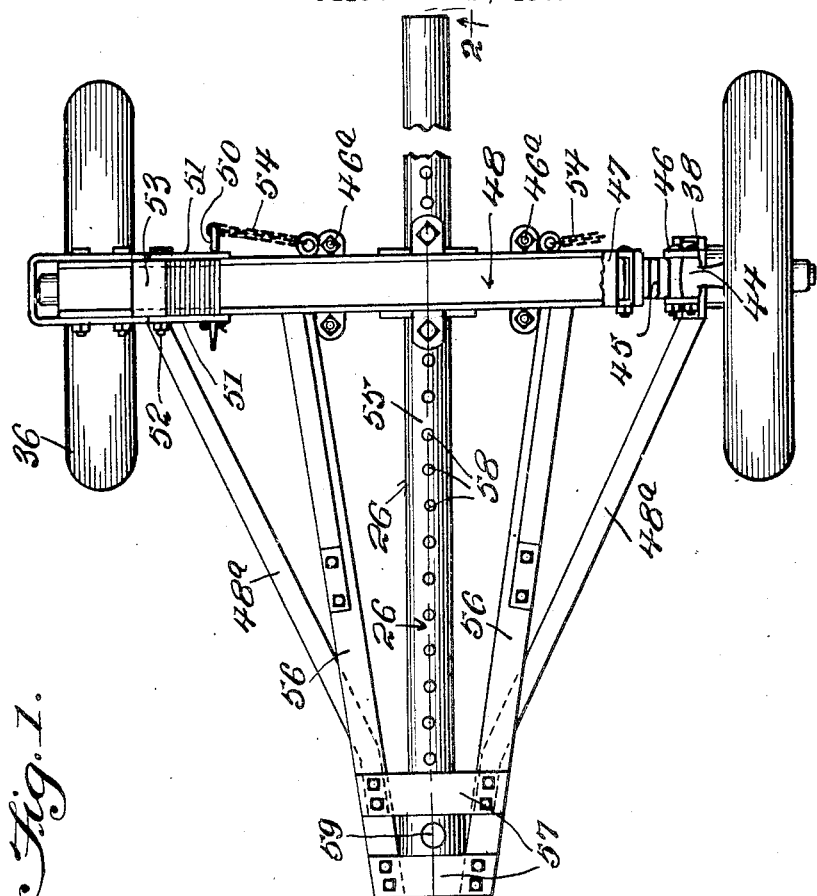
Figure 1 is a plan view of the complete device.
Figure 1:
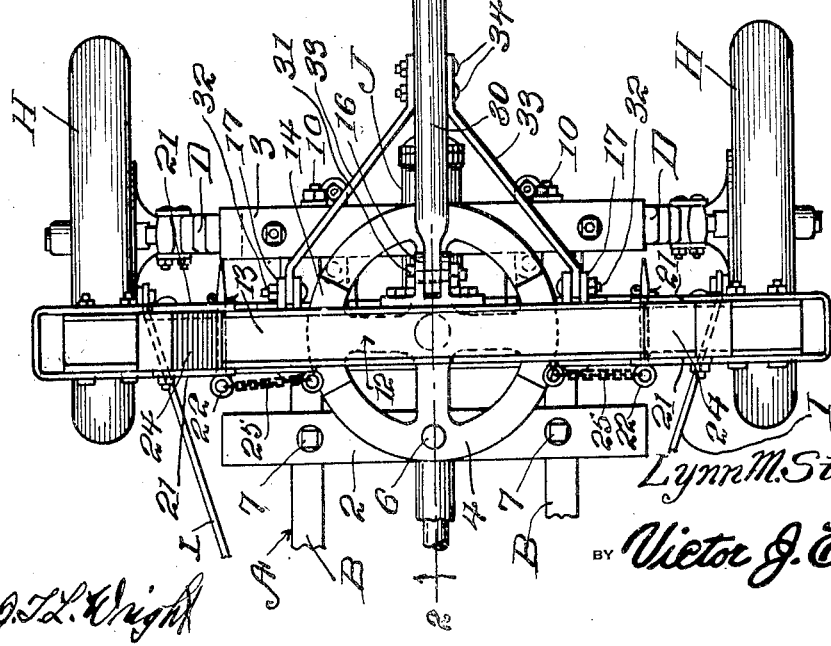

Referring more particularly to the drawings, the letter A designates, generally, a motor vehicle chassis including the usual frame B supported at its rear end or including at its free end a cross member C, usually channel shaped in cross section and arranged in inverted position. This frame is supported by springs D from a rear axle structure designated at E, which structure generally includes a housing F within which are journaled the rear spindles G carrying the wheels H. The rear housing is generally strengthened or braced by means of rear radius rods I and, in case the chassis is of the worm drive type, the rear housing E carries a housing or casing J for the drive shaft and worm gear thereon meshing with a worm wheel connected, by differential gearing, with the spindles G. All this structure is old and well known and no claim for novelty is laid thereto.

In carrying out the present invention I provide an attachment or trailer designated broadly by the numeral 1, which trailer is supported upon or attached to the chassis A above mentioned by the particular means to be described. The attachment comprises in part, a plurality of bars 2 and 3 of suitable length carrying a fifth wheel 4 bolted thereto and formed conveniently as a casting of a ring-like nature with any desired number of spokes in order to insure strength. This fifth wheel 4 is bolted onto the bar 2 by means of bolts indicated at 5 and is secured to the bar 3 by means of other bolts 6 which also pass through the inverted channel shaped cross members C of the chassis frame. The bar 2 may be secured to the frame bars B by means of suitable bolts 7. However, these are details which may be be easily varied within the scope of the invention. It might be mentioned in passing that the bar 3 is shown as concaved on its under surface to accommodate the usual upstanding arch formed in the cross member C. Located between the bars 2 and 3 is a bar 8 located beneath the center of the fifth wheel 4, and located between the bars 2 and 3 are spacing blocks 9 secured in place by means of horizontally extending bolts 10. In the present instance, the fifth wheel 4 is represented as provided with a depending boss 11 fitting within a corresponding socket in the upper face of the bar 8 for a purpose to be explained.

Located above the fifth wheel 4 is a movable bolster structure indicated generally by the numeral 12, which structure includes a bolster proper 13 upon the underside of which are secured arcuate shoes 14 which bear upon the fifth wheel 4, these shoes being of any desired or necessary length. Rivets, bolts or the like indicated at 15 may be provided for effecting securing to the undersides of the bolster. Suitably secured against the rear side of the bolster 13 are spaced ears of a bracket structure 16, for a reason to be explained, and suitably secured to the rear face of the bolster are spaced pairs of bracket members 17, the reason for which will be likewise made apparent. It is of course intended that this entire bolster structure 12 be pivotally mounted with respect to the rear end of the chassis A, and for this reason I have illustrated a suitable king bolt 18 passing through the bolster and through the bar 8. The bolster 13 is shown as resting upon or secured to an angle bar member 19 which carries the brackets 16 and 17 above described, this angle bar being further provided with a boss 20 fitting within a corresponding socket. While it is not necessary, I have shown the bolster 13 as carrying pivotally mounted links 21 held in place by bolts or pins 22 passing through selected holes 23 in the bolster and pivotally connected with block members 24 which are consequently laterally adjustable with respect to the longitudinal axis of the chassis, depending upon the nature of the load or the size and shape of whatever body is to be applied to or mounted upon the trailer structure. It is of course apparent that the pins 22 should be prevented from absolute disengagement from the bolster, so that loss will be prevented, and for this reason I have illustrated chains 25 connected with these pins and suitably anchored to the bolster structure. However, these chains are of such length that they will not in any way interfere with the positioning of the pins through the selected holes 23 in the bolster for adjusting purposes.

The trailer structure further includes a reach rod designated generally by the numeral 26, which reach rod includes a section 27 preferably tubular, though not necessarily, which section is offset intermediate its ends as indicated at 28 with its rear portion 29 arranged horizontally and in parallel relation to its forward portion 30. The front end of the forward portion 30 is pivotally connected, by a bolt 31 or the like between the ears 16 of the bracket structure carried by the front bolster, and pivotally connected at 32 with the ears or brackets 17 are braces 33 which are secured at 34 to the forward portion 30 of the reach rod.

The trailer itself further comprises an axle 35 carrying wheels 36 mounted thereon by means of spindles 37, equipped with suitable nuts or the like, and projecting from perches 38 each of which may be conveniently formed as a casting including arms 39 and 40, the former of which embracingly engages the end portion of the axle and the latter of which has associated therewith a clamping member 41 secured by means of bolts 42 or the like equipped with nuts 43. There are two of these perch devices 35 and they are provided with upward curved extensions 44 which constitute suspension or supporting means for leaf springs 45, by means of the usual shackles 46, the springs 45 being connected, in the usual manner as for instance by means of clips 46, with a transverse inverted U-shaped or channeled frame member 47 carrying a bolster 48. Secured to the lower portions of the clamping members 41 of the perches are forwardly converging and upwardly inclined braces 48. The bolster 48 may be constructed of any preferred or necessary number of parts and is, preferably, provided with a plurality of holes 49 within selected ones of which may be engaged bolts 50 passing through the lower ends of links 51 which are, in turn, pivotally connected at 52 with blocks or other equivalent members 53 which are consequently adjustably mounted along the bolster so as to serve as stops for a load carried by the trailer or for a body mounted thereon. Preferably chains 54 are provided connected with the pins or bolts 50 so that they will not become lost when they are removed from the holes 59.

An additional element of the trailer structure is a reach rod element 55 forming part of the structure designated generally by the numeral 26, which element 55 may be, and in fact preferably is of a tubular construction telescopically receiving the horizontal portion 29 of the reach rod member 27. Connected with the member 55 are rearwardly divergent bars 56 connected by transverse bars or other members 57 with which are also connected the brace bars 48 above described. As mentioned above, the member 55 telescopically receives the horizontal portion 29 of the reach rod structure and for adjustment purposes the members 29 and 55 are formed with a plurality of holes 58 through selected registering ones of which may be passed a suitable bolt, pin or the like indicated at 59 whereby the rear wheels of the trailer structure may be set at any desired distance to the rear of the rear wheels of the motor vehicle chassis to which the device is applied.

In the use of the device it is of course apparent that the reach rod may be extended or contracted depending on the distance desired between the rear axle of the trailer structure and the rear axle of the vehicle chassis. It is also apparent that the block members on the front and rear bolsters may likewise be adjusted so as to be located near or far from the ends of the bolster, depending upon the nature of the load or body to be mounted thereon. When the trailer structure is in use and drawn along the ground, it is quite obvious that the front bolster thereof may pivot upon the fifth wheel provided at the rear end of the vehicle chassis so that the trailer wheels can follow those of the chassis without resulting in any binding action. Furthermore, it is evident that the structure is strong and durable so as to be capable of withstanding serious strain such as are exerted when heavy loads are handled. It is really believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:—

1. In a trailer construction, a frame device including a plurality of bars adapted to be mounted transversely of and upon a motor vehicle chassis, a fifth wheel carried by said frame, a bolster having a king bolt mounting at the center of the fifth wheel and carrying shoes bearing upon the fifth wheel, a reach rod pivoted for vertical movement at the rear side of the bolster, brace members pivoted for vertical movement at the rear side of the bolster and connected with the reach rod, and a frame mounted upon ground engaging wheels and connected with the rear end of the bolster.

2. In a trailer construction, a frame device including a plurality of bars adapted to be mounted transversely of and upon a motor vehicle chassis, a fifth wheel carried by said frame, a bolster having a king bolt mounting at the center of the fifth wheel and carrying shoes bearing upon the fifth wheel, a reach rod pivoted for vertical movement at the rear side of the bolster, brace members pivoted for vertical movement at the rear side of the bolster and connected with the rear rod, and a frame mounted upon ground engaging wheels and connected with the rear end of the bolster, said last named frame comprising perches mounted upon the end portions of the axle and carrying spring supporting means connected with the last named frame, and brace members connected with the perches and with the reach rod.

3. In a trailer construction, an axle terminating in spindles carrying ground engaging wheels, perches engaged upon the end portions of the axle, and each including a portion embracingly engaging the axle and further including a portion bearing against the upper portion of the axle, clamping members cooperating with said second named portion for maintaining the perches in applied position, a frame member, a spring device secured to the frame member and having a shackle suspension from the perches, a bolster mounted on the frame member, a reach rod mounted beneath and secured to said frame member, braces connected with the perches and with said reach rod, a bolster connected with the forward ends of the reach rod and braced with respect thereto, and a fifth wheel supporting means for the second named bolster including a frame adapted to be bolted onto a vehicle chassis.

In testimony hereof I affix my signature.

LYNN MILTON STEPHENS.